Feb. 28, 1961 D. W. MacLEOD 2,972,774
MIXERS FOR PLASTIC MATERIALS WITH
LIQUID DISCHARGE MEANS

Filed Nov. 9, 1959 2 Sheets-Sheet 2

INVENTOR
Douglas W. MacLeod
BY Rockwell & Bartholow
ATTORNEYS

United States Patent Office 2,972,774
Patented Feb. 28, 1961

2,972,774

MIXERS FOR PLASTIC MATERIALS WITH LIQUID DISCHARGE MEANS

Douglas W. MacLeod, Ansonia, Conn., assignor to Farrel-Birmingham Company, Incorporated, Ansonia, Conn., a corporation of Connecticut Filed Nov. 9, 1959, Ser. No. 851,785

11 Claims. (Cl. 18—2)

This invention relates to a process of and apparatus for demoisturizing of plastic material such as rubber, for example, and particularly to the performance of such a process during the mixing or masticating of the plastic material in a mixer such as the well-known "Banbury" mixer, for example. The invention particularly relates to an improvement in the apparatus which provides for the draining off of the water or other liquid or volatile material from the mixer.

Plastic materials such as rubber, for example, contain varying amounts of liquid material such as water, and it is desirable that this water be driven off or forced from the material so that it may be properly plasticized in relatively dry form. This demoisturizing operation may be carried out in the mixing device shown, and some means should then be provided to carry or drain off the liquid material so as to leave the solid portion of the mass in relatively dry form.

In the usual form of the "Banbury" mixer a chamber is provided in which are mounted one or more bladed rotors to masticate the material, and during this operation water will be expressed therefrom. The chamber is usually closed at the top by a floating weight or ram, and it has been found expedient to permit water or other liquid material to be expressed upwardly around the sides of this weight to accumulate in the area of the upper surface thereof. As illustrated, the upper surface of the weight or ram is sloping or inclined so that this water will drain toward one or both sides thereof and at one or both sides is mounted a discharge tube through which it may be vented. This discharge or drain tube will be properly controlled so as to be open while the mixer is in operation and to be closed when the mixer is being loaded through the stack or hopper so that the opening will not be clogged during the loading operation.

In addition operating means for the control of the drain tube are provided and are interconnected with the means for operating the piston which serves to raise and lower the weight or ram so that the opening or closing of the drain tube will be automatically effected according to the position of the ram.

One object of the present invention is to provide a new and improved apparatus for the demoisturizing of rubber or other plastic material.

A further object of the invention is to provide improved means for draining off the moisture or liquid material from a mass being worked in a mixer such as the usual "Banbury" mixer.

Still another object of the invention is to provide a drain opening in the loading stack of a "Banbury" mixer adapted to drain moisture or liquid material from the stack above the floating ram which closes the chamber, the drain opening being so controlled that it will be closed when the ram or weight is in an upper position and open when the ram is in a lower position which it occupies during operation of the mixer.

To these and other ends the invention consists in the novel features and combinations of parts to be hereinafter described and claimed.

Figure 1:
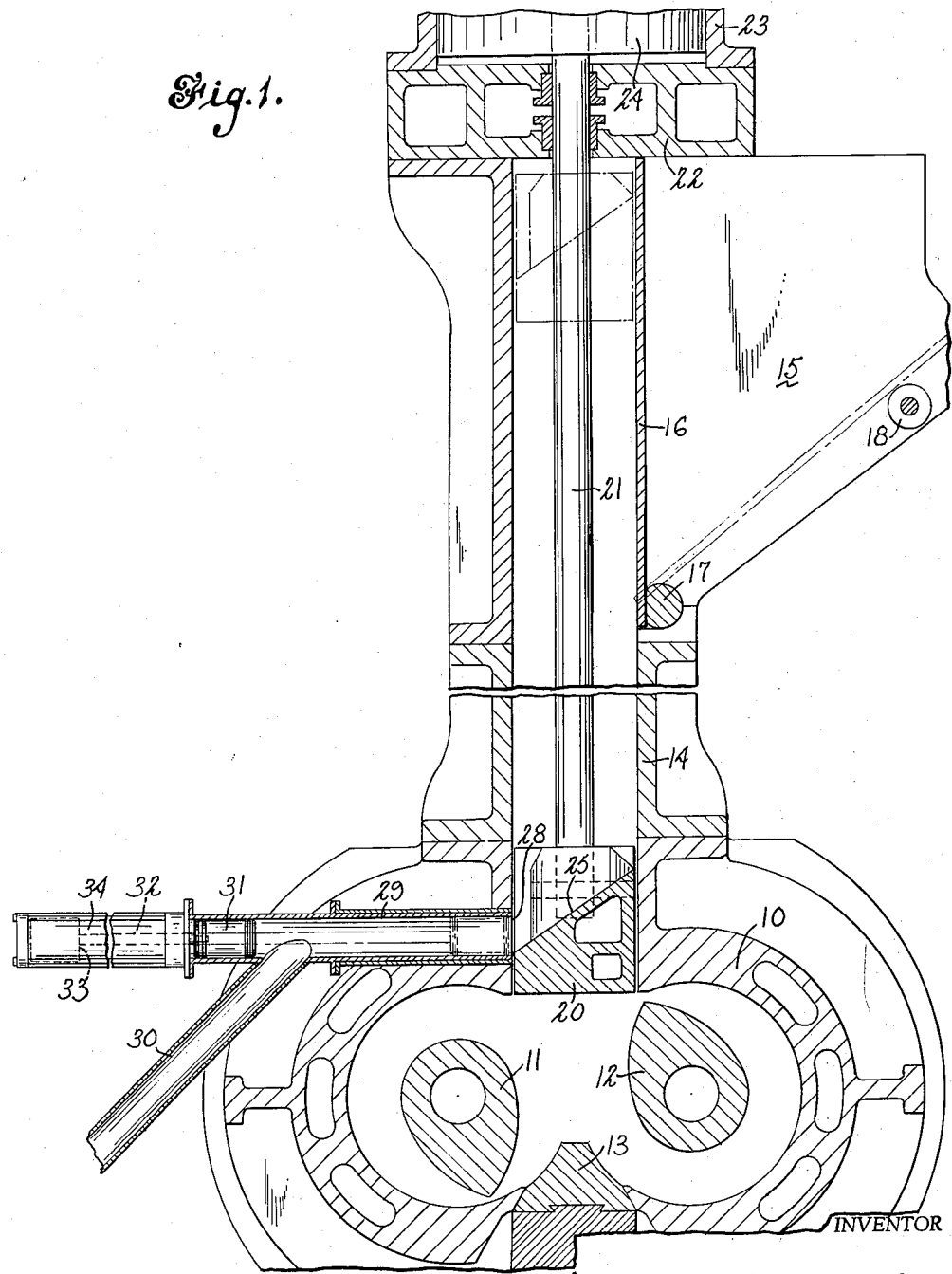
Fig. 1 is a sectional view of a mixer for plastic materials of the "Banbury" type embodying my invention.

As illustrated in the drawings the mixer of the "Banbury" type comprises a chamber 10 having bladed rotors 11 and 12 rotatably mounted therein. The chamber may be closed at the bottom by the usual sliding or swinging door 13 whereby the material may be discharged after the operation has been completed.

Leading into the upper side of the chamber 10 is a loading stack 14 provided with a loading hopper 15 in communication with the interior of the stack. The opening between the hopper and the stack may be controlled by a swinging door 16 pivoted to the stack at 17 so that the door may be swung outwardly to lie upon the limiting member 18 while the material is being charged into the stack, as shown in dotted lines in Fig. 1, and then swung upwardly to its full-line position when the ram (to be later described) is moved downwardly to force the material into the chamber 10.

A weight or ram 20 is slidably mounted in the stack and is carried at the lower end of a piston rod 21. The upper end of this rod passes through a guide member 22 into a cylinder 23 mounted on the guide member. At its upper end a piston 24 is carried by the piston rod so that as hereinafter explained fluid pressure may be introduced into the cylinder above and below the piston to raise or lower the weight or to hold it in lowered position under desired pressure.

Some clearance is provided between the ram 20 and the side walls of the stack to permit the water or liquid material expressed from the mass in the chamber to rise upwardly around the ram and collect on the upper surface thereof. As shown this surface is sloping or inclined, as shown at 25, so that the liquid material collecting thereon will tend to drain toward one side thereof. It may also be noted that a rod 26 is secured to the ram at one side thereof, this rod extending upwardly through the stack 14 and guide 22 at the outside of the cylinder 23 to operate a switch to be hereinafter referred to.

At one side of the stack is provided a drain opening 28 to which is connected a tube 29, and communicating with this tube at a point spaced from the stack is an inclined drain pipe 30. This opening is provided at that side of the stack toward which the upper area or surface 25 of the ram 20 slopes so as to carry off the water collecting on the upper surface of the ram. The opening 28 is controlled by a plunger 31 slidably mounted in the tube 29, this plunger being secured to a piston rod 32 connected to a piston 33 slidably mounted within a cylinder 34 secured to the end of the tube 29.

As shown in full lines in Fig. 1 the piston 33 is at the left-hand end of the cylinder 34, and the plunger 31 is in its withdrawn or retracted position so that communication is provided through the opening 28 between the interior of the stack 14 and the tube 29 and drain pipe 30, thus permitting the liquid to drain from the upper side of the ram. Arrangements are made to admit fluid pressure such as pneumatic pressure, for example, to the cylinder 34 at either side of the piston 33 so that the plunger 31 may be moved to this retracted position shown in full lines or advanced to the position shown in dotted lines in Fig. 1, in which position the opening 28 in the stack 14 is closed. As will be explained hereinafter, the plunger 31 will be moved to the latter position during the charging of the chamber through the stack 14 so that the charged material will not be forced into the drain tube 29.

Figure 2:
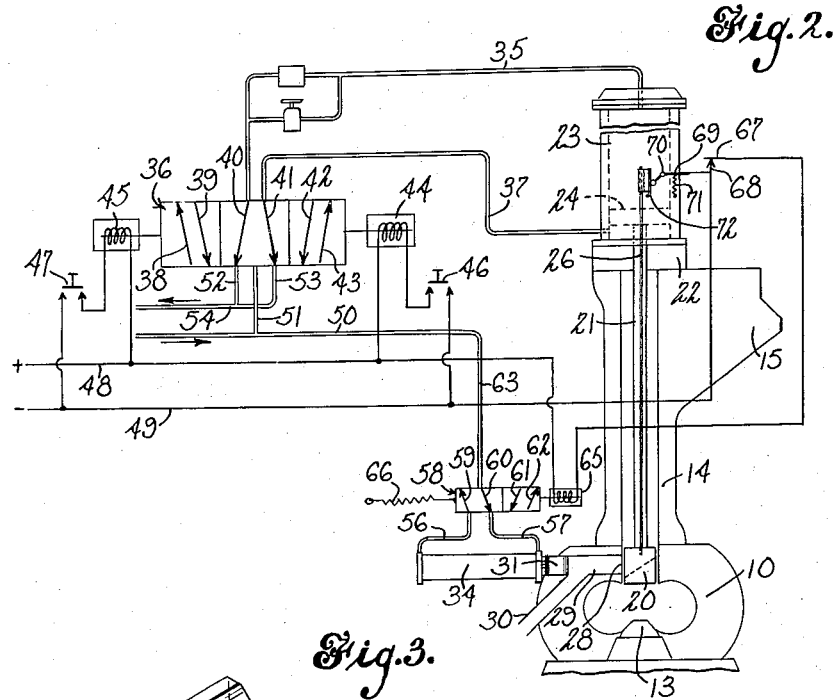
Fig. 2 is a diagrammatic view of the control means for the floating weight or ram of the mixer and the drain opening provided therefor.
Figure 3:
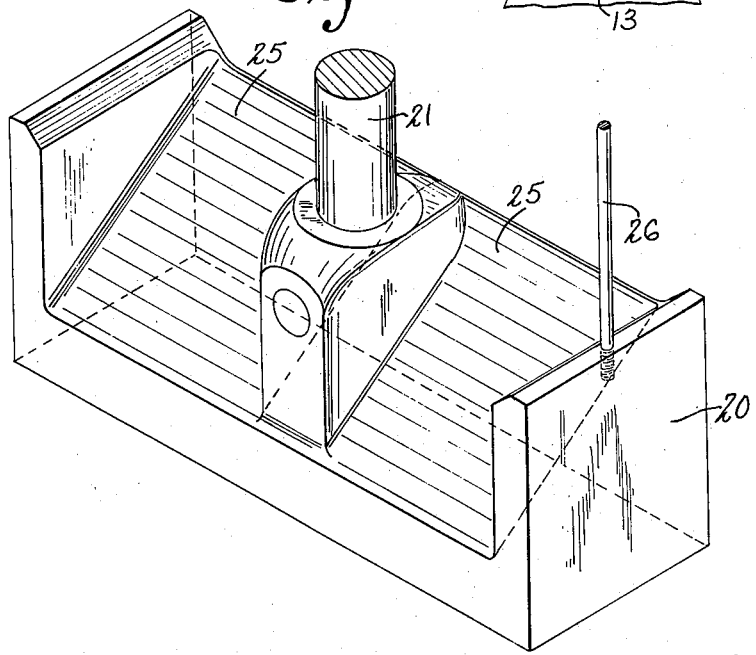
Fig. 3 is a perspective view of the floating weight or ram.

As shown in Fig. 2, means are provided for admitting pressure fluid into the cylinder 23 either above or below the piston 24 to raise and lower the ram. As illustrated, a conduit 35 leads from the upper end of the cylinder to a control valve 36, and a conduit 37 leads to this valve mechanism from the lower end of the cylinder 23. This valve is provided with passages 38, 39, 40, 41, 42 and 43, and is actuated in one direction by a solenoid 44 and in the other direction by a solenoid 45, which solenoids may be energized by switches 46 and 47 respectively from the lines 48 and 49 leading to a suitable source of current.

Leading from a suitable source of fluid pressure such as pneumatic pressure, for example, is a conduit 50 connected to the valve 36 by the conduit 51. Branch conduits 52 and 53 lead from the valve 36 to an exhaust conduit 54.

As also shown in Fig. 2, conduits 56 and 57 lead from opposite ends of the cylinder 34, which controls the plunger 31, to a valve mechanism 58 having passages 59, 60, 61 and 62 therein. A conduit 63 leads from this valve mechanism to the conduit 50 to connect the valve mechanism with the source of fluid pressure.

The valve mechanism 58 is actuated in one direction by the solenoid 65, and in the other direction by a spring 66. It will be seen, therefore, that the valve 58 has no neutral position but stands at one or the other of the limits of its movement.

The solenoid 65 is energized from the leads 48 and 49 through the switch contacts 67 and 68. The contact 68 represents the movable contact and is moved by an actuating member 69 pivoted at 70 upon the cylinder 23 and is biased toward open position by the spring 71. The rod 26, which is connected to the ram 20, as was previously described, is provided with a wiper 72 designed to engage the actuating member 69 and move the switch contact 68 to closed position to energize the solenoid 65.

As shown in Fig. 2 the ram is in its lower position, and the valve 36 is in its neutral position. In this position of the valve the passages 40 and 41 connect both conduits 35 and 37 to the exhaust conduit 54 so that no pressure will be present in the cylinder 23 either above or below the piston 24. Usually, however, when the mixer is in operation and the ram in the lower position shown, the switch 46 will be closed and the valve 36 moved to the right. In this position the passage 38 will connect the conduit 35 with the fluid pressure supply conduit 51 while the conduit 37 will be connected by the passage 39 to the exhaust conduit 53, thus introducing the desired amount of pressure above the piston 24 to urge the ram downwardly. This pressure may be regulated by a suitable regulating valve in the line 35.

In this position of the parts it will be noted that the wiper 72 contacts the switch-actuating member 69 so as to energize the solenoid 65 and move the valve 58 to the position shown in Fig. 2 wherein fluid pressure is introduced into the right-hand end of the cylinder 34 through the passages 57, 60 and 63, thus moving the plunger 31 to the full-line position shown in Fig. 1. The opening 28 is then uncovered and water or other liquid collected on the upper surface of the plunger may drain off through the tube 29 and inclined drain pipe 30. After the operation has been completed and the chamber emptied, the switch 46 is opened and the switch 47 is closed, thus moving the valve 36 toward the left. In this position the conduit 35 is connected to exhaust through the passage 42 while the conduit 37 is connected to the source of pressure through the passage 43 and conduit 51, thus exhausting the upper end of cylinder 23 and introducing fluid pressure to the lower end to raise the ram so as to permit charging of the chamber through the hopper 15.

When the ram is raised, the wiper 72 on the rod 26 is moved out of contact with the tail of the actuating member 69 so as to permit the spring 71 to open the switch contacts 67 and 68 and deenergize the solenoid 65. Thereupon the spring 66 moves the valve 58 to the left where, through passages 61 and 62, the left-hand end of the cylinder 34 is pressurized and the right-hand end opened to exhaust. The piston 33 then moves the plunger 31 to the dotted-line position shown in Fig. 1 to close the opening 28.

The chamber 10 may now be charged with a fresh batch of material through the hopper 15 and, when a sufficient charge has been placed in the hopper, the switch 46 will again be closed to drive the ram 20 downwardly and force the material into the chamber. During the downward movement of the ram the plunger 31 remains in its advanced position, closing the opening 28 so that the material will not be forced into the drain tube 29. When, however, the ram reaches a position opposite the opening 28, the switch-actuating member 69 will again be moved to the position shown in Fig. 2 wherein the solenoid 65 is energized and the plunger 31 retracted to the position shown in full lines in Fig. 1.

The same pressure fluid system may be employed to operate the swinging loading door 16 so that this door will be moved to its closed position shown in full lines in Fig. 1 upon descent of the ram and will be moved to its loading position shown in dotted lines in Fig. 1 when the ram is raised.

As illustrated, the upper surface of the ram 20 slopes toward one side. If desired, however, the upper surface of the ram may be of inverted V shape so as to slope in both directions from a central ridge. In such case the drain tube 29 together with its operating cylinder and piston would be duplicated at the other side of the charging passage and be controlled in the same manner as described above.

While I have shown and described an embodiment of my invention, it will be understood that it is not to be limited to all of the details shown, but is capable of modification and variation within the spirit of the invention and within the scope of the claims.

What I claim is:

1. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, and a laterally directed drain tube connected with said opening and extending through a wall of the chamber to carry away the liquid from the upper surface of the ram.

2. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, and a member movably mounted in said drain tube for closing said opening.

3. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, and a closure member reciprocably mounted in said tube and movable to a forward position to close the opening in the wall of the passage and to a retracted position to uncover said opening.

4. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, and fluid pressure means for operating said closure member.

5. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, and a drain pipe leading downwardly from said drain tube at a point between the limit positions of said closure member.

6. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, and the upper surface of the ram being inclined downwardly toward the opening in the charging passage.

7. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, means for moving said closure member from one position to the other, and means controlled by the position of the ram and actuating said moving means.

8. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent to the upper portion of the ram when the latter is in closed position, a laterally directed drain tube connected with said opening to carry away the liquid from the upper surface of the ram, a closure member in said drain tube movable to and from a position to close said opening, and means actuated by movement of the ram to move said closure member.

9. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, fluid-pressure means to move said closure member, and means actuated by movement of the ram to a position adjacent the chamber to introduce fluid pressure to said means.

10. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, fluid-pressure-actuated means to move said closure member, a valve controlling the introduction of fluid pressure to said means, and means actuated by movement of the ram to a position adjacent the chamber to actuate said valve.

11. A mixer for treating and demoisturizing plastic material having a chamber within which the material is treated, said chamber having a charging passage, a charging stack communicating with said passage through which the material is introduced into the chamber, a ram slidably mounted in the stack to close said passage with lateral clearance between the ram and the wall of the passage to permit liquid to pass upwardly from the chamber to the upper surface of the ram, the wall of said passage having a laterally directed opening therein adjacent the upper portion of the ram when the latter is in closed position, a drain tube connected with said opening to carry away the liquid from the upper surface of the ram, a closure member reciprocably mounted in said tube and movable to a forward position to close the opening in the wall of the passage and to a retracted position to uncover said opening, fluid-pressure-actuated means to move said closure member, a valve controlling the introduction of fluid pressure to said means, electrical means for moving said valve, and a switch actuated by movement of the plunger to energize said electrical means.

References Cited in the file of this patent

UNITED STATES PATENTS

| | | |
|---|---|---|
| 1,189,444 | Hale | July 4, 1916 |
| 1,498,986 | Banbury | July 24, 1924 |
| 1,689,990 | Banbury | Oct. 30, 1928 |
| 2,351,706 | Robinson | June 20, 1944 |
| 2,923,967 | Smith | Feb. 9, 1960 |